Dec. 24, 1929.  N. J. OFSTAD  1,740,870
FRUIT WASHING MACHINE
Filed Dec. 5, 1925   3 Sheets-Sheet 1
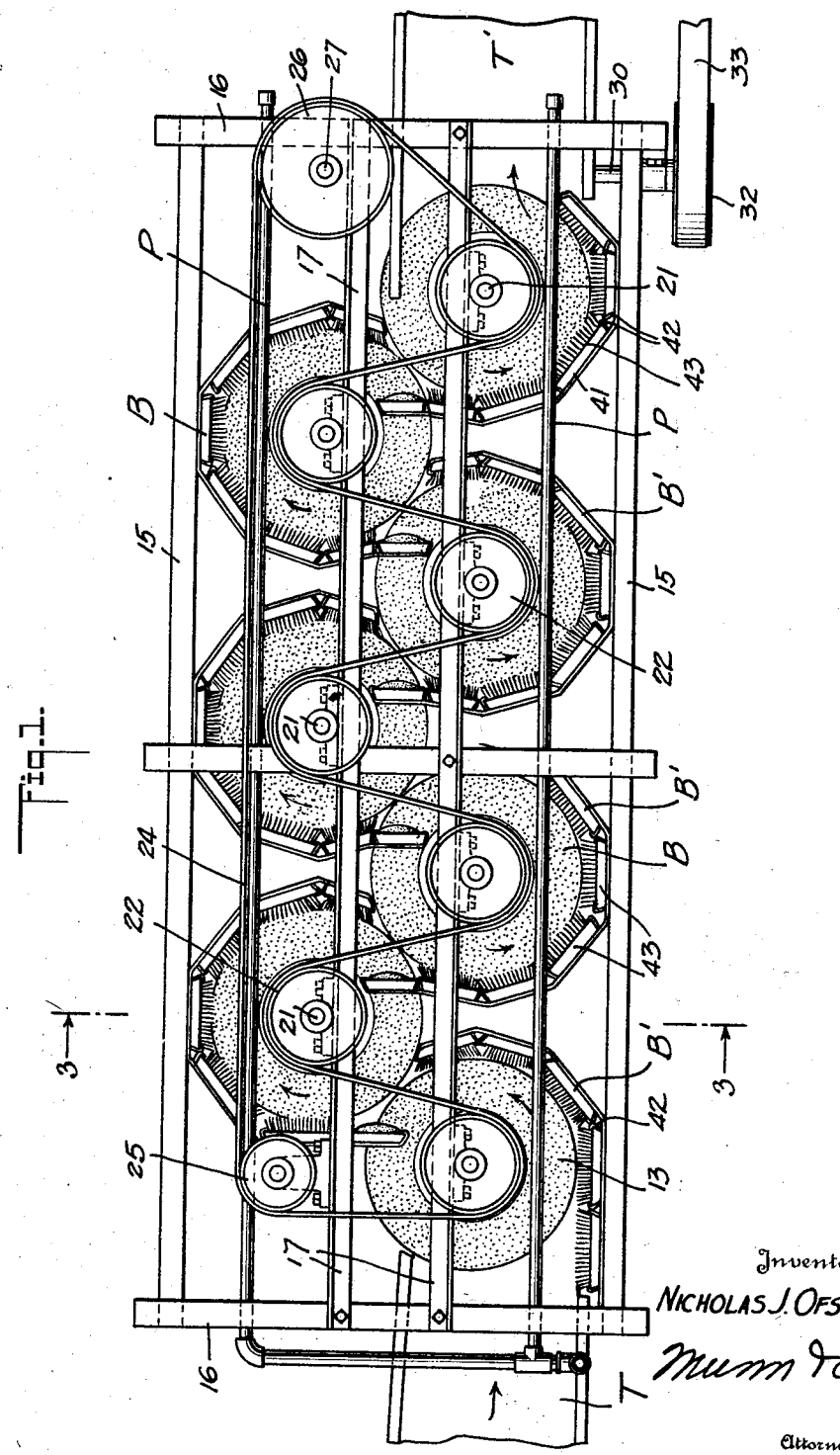
Inventor
NICHOLAS J. OFSTAD
Munn &Co.
Attorneys

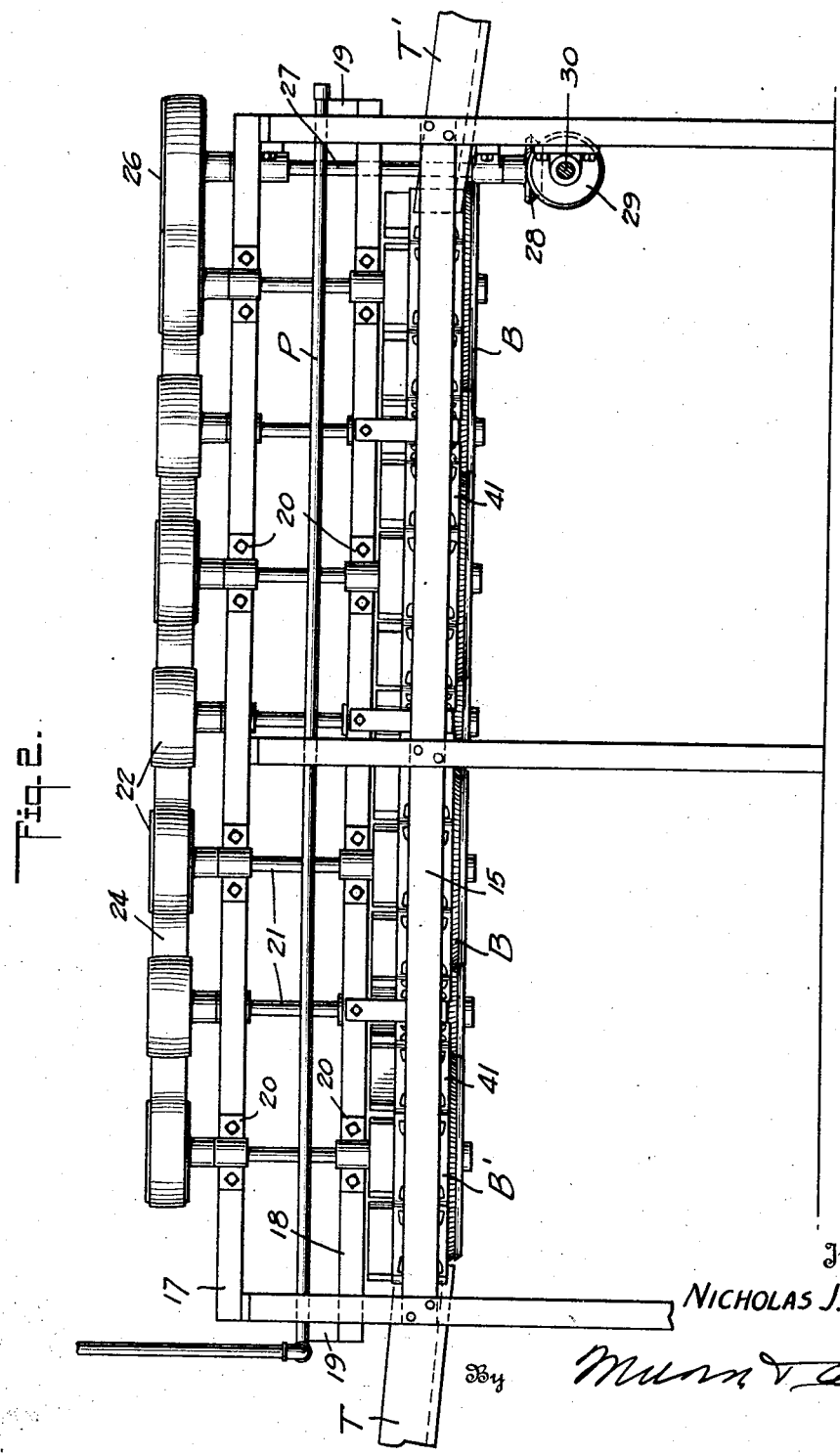

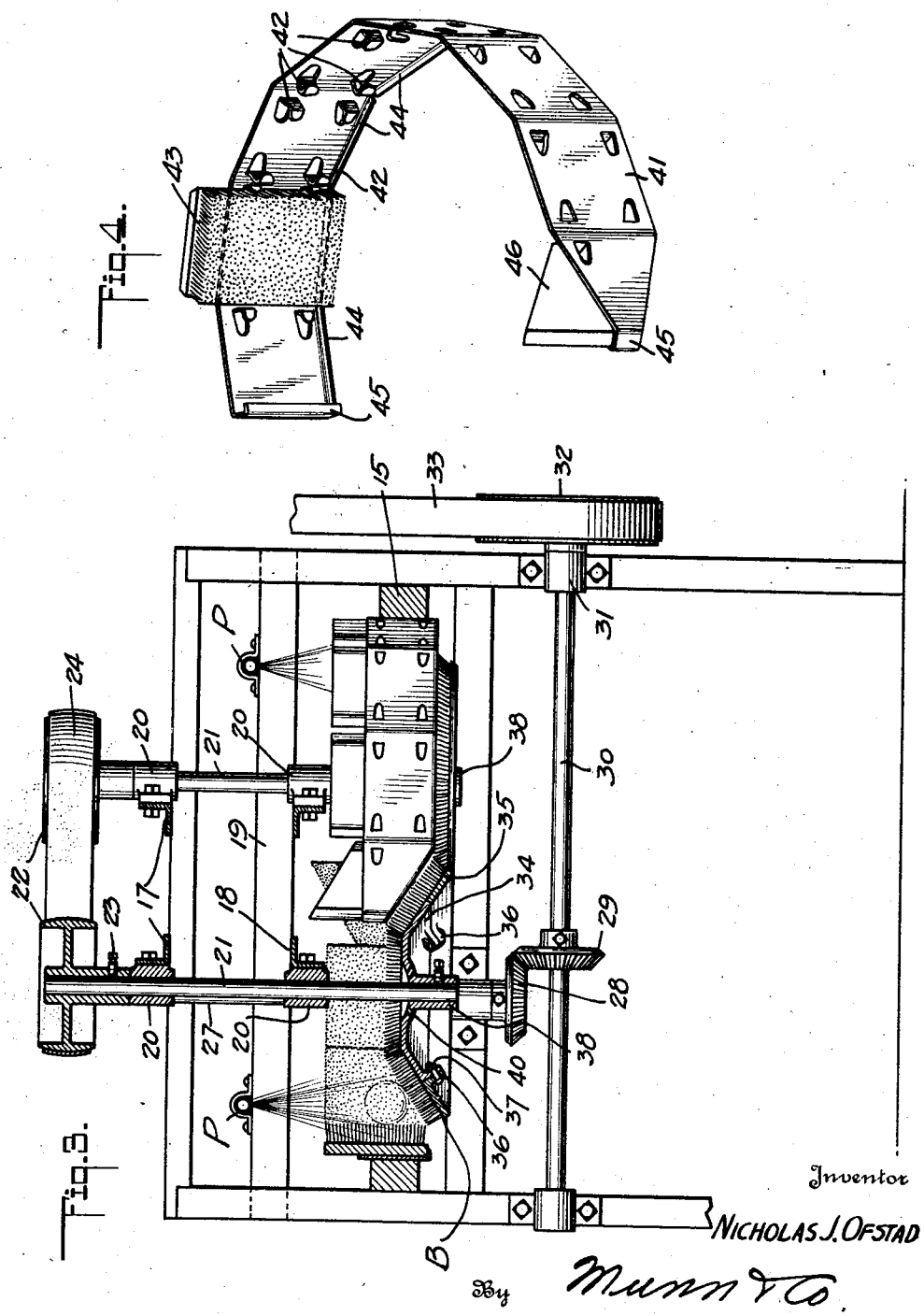

Patented Dec. 24, 1929

1,740,870

UNITED STATES PATENT OFFICE

NICHOLAS J. OFSTAD, OF REDLANDS, CALIFORNIA, ASSIGNOR TO WILLIAM L. CONNOR, OF LOS ANGELES, CALIFORNIA

FRUIT-WASHING MACHINE

Application filed December 5, 1925. Serial No. 73,372.

My invention relates to fruit washing machines of the general character embodied in my co-pending application Serial No. 53,666, filed August 31, 1925, of which the present application is a continuation in part.

Broadly considered, my invention comprises means for cleaning fruits, and the like, in which I provide a relatively stationary element and a relatively movable element, angularly disposed relative to each other, for forming a substantially V-shaped trough for supporting the fruit and propelling it continuously, in one direction, in a substantially horizontal plane. Either one or both of these surfaces may be provided with cleaning means or abrading surfaces, such as brushes or the like, to effect a surface cleaning of the fruit and aid in its propulsion, the character of the surface depending upon the fruit being handled.

In its broadest aspect, the foremost object is to rely upon gravity, i. e., the weight of the fruit, for effecting the necessary pressural contact with the cleaning surfaces, while the relatively moving surface tends to convey and the relatively stationary surface tends to retard movement of the fruit, resulting in a rolling and tumbling of the fruit in contact with the cleaning surfaces.
To effect a thorough cleaning, a V-shaped trough is provided to propel and carry the fruit in a substantially horizontal plane.

In its more limited aspects, as in the case of the horizontally rotating surfaces in combination with the relatively stationary arcuate surfaces, gravity is assisted by centrifugal force, and this may be increased as desired to effect more thorough cleaning, merely by increasing the speed of rotation.
In its still more limited sense, as in the case of the horizontally rotating conical surfaces, gravity is assisted both by centrifugal force and the conical surfaces, the latter admitting of a slower speed of rotation to effect the same end. This form is more desirable for cleaning fruits, such as oranges and lemons, which have tender skins, and when even slight bruising is to be avoided.

The arrangement of the rotating surfaces, conical or otherwise, in combination with the individual arcuate stationary surfaces, also admits of a compact construction, wherein a maximum of cleaning contact may be obtained within a minimum of floor space.

With the use of the conical surfaces, not only is the fruit revolved as it is conveyed in the V-shaped troughs, but the inclined surfaces of the peripherally adjacent brushes, moving in the same direction, also provide V-shaped troughs for conveying the fruit from the trough of one unit to the next, and intermediate the ends of the stationary surfaces, while at the same time rolling the fruit over backwards, as it is conveyed thereby, to insure thorough cleaning of all parts.

The combination of a plurality of washing units, each comprising the combination of a horizontally rotating brush and an arcuate stationary brush, arranged either in staggered or linear relation, also admits of a driving mechanism for all the units arranged above them, permitting the use of water or other cleaning solution, directed over the fruit as it travels through the machine, without danger of injury to the driving mechanism or any interference with its lubrication.

In my preferred construction, as herein shown and described, I utilize a stationary brush element having brushes which are reversible and interchangeable with respect to each other, and while these do not tend to any limitation of the broader features of my invention, such an arrangement conduces to economy of construction, maintenance and operation. Also, as herein shown and described, the stationary brush elements are arranged to terminate at or slightly beyond the peripheries of adjacent rotary brushes to provide guiding abutments for directing the fruit from one unit to another in a manner to preclude injury to the fruit.

I will describe only one form of fruit washing machine embodying my invention and will then point out the novel features thereof in claims.

In the accompanying drawings:

Figure 1 is a view showing in top plan one form of fruit washing machine embodying my invention;

Figure 2 is a view showing in side elevation the machine shown in Figure 1;

Figure 3 is a vertical sectional view taken on the line 3—3 of Figure 1;

Figure 4 is an enlarged detail perspective view of the frame of one of the stationary brush elements embodied in the machine shown in the preceding views.

Similar reference characters refer to similar parts in each of the several views.

Referring specifically to the drawings, my invention, in its present embodiment, comprises a skeleton frame of rectangular form and including longitudinal beams 15, transverse beams 16, an upper pair of rails 17, and a lower pair of rails 18, the latter being secured to transverse beams 19 and the former secured to the transverse beams 16. As shown in Figure 2, the rails 17 and 18 have secured thereto bearings 20 in which shafts 21 are journaled, and fixed to the lower ends of the shafts are conical rotary brush elements designated generally at B, while at the upper ends pulleys 22 are fixed to the shafts by means of set screws 23.

By reference to Figure 1, it will be seen that the rotary brush elements are arranged in staggered relation with respect to each other, and the shafts 21 occupy corresponding positions, so that an endless belt 24 can be trained about the several pulleys 22, around an idler pulley 25 and around a driving pulley 26, the latter, as shown in Figure 2, being fixed to the upper end of a shaft 27 journaled in suitable bearings in the frame and provided at its lower end with a bevel gear 28 meshing with a similar gear 29 fixed to a shaft 30. The shaft 30, in turn, is journaled in bearings 31 and is provided at one end with a pulley 32 about which is trained a belt 33, the latter, in turn, being connected to any suitable source of power (not shown) for continuously rotating the shaft 30 in one direction.

Each rotary brush element B constitutes part of a washing unit, and the remainder of the unit includes a stationary brush element designated at B'. As in my previous application hereinbefore referred to, the present arrangement of washing units is such as to thoroughly wash and clean and continuously feed fruit from one unit to the other successively throughout the entire length of the machine, an inclined feeding trough T being arranged at one end of the frame for supplying fruit to the adjacent endmost washing unit, and a receiving trough T' being arranged at the opposite end of the frame for receiving the cleaned fruit as discharged from the adjacent endmost washing unit. As the construction of the elements of each washing unit is substantially identical, a description of one will suffice for all.

As shown in Figure 3, each rotary brush element comprises a rotary brush of frusto-conical form and including a body or backing made up of an upper section 34 and a lower section 35, the two sections being provided at corresponding points with ears 36 through which bolts 37 extend for firmly clamping the lower section to the upper section. The upper section 34 is provided with a hub 38 secured to the corresponding shaft 21 and cupped at its upper end, as indicated at 39. This cupped portion 39 is provided with drain openings 40 through which water accumulating in the cup portion is free to drain through the brush body.

As illustrated to advantage in Figure 4, each stationary brush element comprises a frame of arcuate form and constructed from a single length of metal or other suitable material bent transversely at regular spaced intervals along its length to provide a plurality of facets or mountings 41 each of which is out-struck to form tongues 42 so bent and arranged as to slidably receive a stationary brush 43. Each brush 43 is limited in its downward movement on the frame by the provision of flanges 44 at the lower edge of the frame, and by reference to Figure 1 it will be clear that the tongues 42 are constructed to receive the beveled vertical edges of the backs of the brushes 43. As shown in Figure 4, the two end-most mountings or facets of the frame are provided with a vertically extending lip to co-operate with the adjacent tongues 42 in supporting a brush 43 therein in one instance and a guiding abutment 46 in the other. The mounting of the abutment 46 is tapered as shown in Figures 3 and 4, in order that it may be extended over and be disposed parallel to the inclined surface of the adjacent rotary brush. This abutment 46 consists of a backing having beveled vertical edges and a padding thereon of such material that when fruit is impinged thereagainst it will not be injured, while at the same time the abutment will serve the purpose of guiding the fruit from one rotary brush to another.

Each frame of the stationary brush elements is secured to the frame of the machine so as to encircle a major portion of the periphery of the corresponding rotary brush and in a manner to effectively co-operate with the latter in effecting the cleaning of the fruit. That end of the frame carrying a brush 43 is extended between adjacent rotary brushes, as clearly illustrated in Figure 1, and in a manner to effectively span the gap between the rotary brushes to prevent small fruit from dropping between the rotary brushes. The other end-most brush 43 of any one frame is disposed in a similar manner as described in connection with the other end-most brush and is also designed to function to prevent small fruit from dropping between the adjacent rotary brushes. The guiding abutment 46 of any one washing unit is supported above the rotary brush of an adjacent unit, as clearly shown in Figure 1, so as to intercept fruit on the corresponding rotary brush and thus cause it to be delivered to the next rotary brush in advance.

As all of the brushes 43 are identical in construction and size, and the mountings therefor likewise identical in construction and size, it will be manifest that the brushes are interchangeable. Further, the brushes 43 are reversible in their mountings so that should the lower portion of the brush, or that portion which receives the greatest wear, become unduly worn, the brush can be inverted in its mounting, so as to dispose the worn portion uppermost and the unworn portion lowermost. The mounting of the guiding abutments is similar in these respects in that they are interchangeable and reversible.

In the operation of the machine, fruit delivered onto the rotary brush of the first washing unit from the trough T is caused to travel in a circular path and into engagement with the stationary brushes 43. The corresponding guiding abutment 46 intercepts the fruit in its circular movement, so as to guide the later from the first rotary brush to the rotary brush of the second washing unit, whence it is again subjected to a scrubbing operation through the co-operation of the rotary and stationary brushes, and finally delivered to the next washing unit. In this manner, the fruit is successively scrubbed and fed from one washing unit to the other throughout the entire length of the machine, and during this operation water from spray pipes P, provided for the purpose, is discharged downwardly onto the fruit and brushes to effect a thorough washing of the fruit, as will be understood.

In effecting the cleaning of fruits, the relatively movable member acts to propel the fruit while the relatively stationary member acts to retard its movement, to the extent that the fruit is rolled and turned in all directions on the cleaning surfaces. As the fruit is propelled along the stationary arcuate surfaces, gravity is assisted by centrifugal force exerted by the rotary member, which tends to force the fruit against the cleaning surface of the stationary member, in a substantially horizontal plane, efficiently cleaning uneven surfaces of the fruit.

Cleaning surfaces may be provided on either one or both members of each unit, the latter being the most preferred.

It may be readily seen that the machine may be made up of one or more washing units, and that these may be either arranged in a straight line or in staggered relation, as illustrated in Figure 1. However, the latter arrangement admits of economizing space and is preferable in most cases.

It is to be particularly noted that constructing the rotary brush body of two sections permits the ready removal of the lower section 35 for the purpose of substituting a new section when the first section becomes unduly worn, as it will be understood that the lower section of the brush is subjected to the greatest wear.

Although I have herein shown and described only one form of fruit washing machine embodying my invention, it is to be understood that various changes and modifications may be made therein without departing from the spirit of the invention and the spirit and scope of the appended claims.

I claim as my invention:

1. In a fruit cleaning machine, a plurality of horizontal rotary brushes arranged in respective side by side rows, stationary vertical brushes extending partly around the respective brushes, so as to form a sinuous course for the fruit extending throughout the length of the machine, the horizontal brushes having surfaces co-acting with the vertical brushes so as to maintain constant contact of the fruit against said vertical brushes, and means to revolve all of said horizontal brushes to cause the fruit as it is propelled by the rotary action of said brushes to alternately move from the horizontal brushes of one of said rows to the horizontal brushes of the other said row progressively.

2. In a fruit cleaning machine, a plurality of horizontal rotary brushes arranged in respective side by side rows, stationary vertical brushes extending partly around the respective brushes, so as to form a sinuous course for the fruit extending throughout the length of the machine, the horizontal brushes having surfaces co-acting with the vertical brushes so as to maintain constant contact of the fruit against said vertical brushes, and means to revolve all of said horizontal brushes to cause the fruit as it is propelled by the rotary action of said brushes to alternately move from the horizontal brushes of one of said rows to the horizontal brushes of the other said row progressively, and means for subjecting the fruit to the action of a cleansing solution as the fruit moves over said course.

3. A fruit cleaning machine comprising horizontal frusto-conical rotary brushes, and brushes disposed in co-acting relation to the horizontal brushes so that the flared walls of the latter will cause the fruit to maintain a position of active contact with the former while permitting the fruit to be impelled there-over by the action of rotation of said rotary brushes.

4. In a machine for cleaning fruit and the like, a cleaning unit comprising: a cone-shaped rotary member and a relatively stationary arcuate wall arranged concentrically to the axis of said rotary member, to form a substantially V-shaped trough in which the fruit is movably supported and propelled in a substantially horizontal plane, said wall being non-continuous to provide feed and discharge passages, in a horizontal plane, to and from the surface of the rotary member, adjacent its periphery, and a cleaning surface on said rotary member.

5. In a machine for cleaning fruit and the like, a cleaning unit comprising: a cone-shaped rotary member and a relatively stationary arcuate wall arranged concentrically to the axis of said rotary member, to form a substantially V-shaped trough in which the fruit is movably supported and propelled in a substantially horizontal plane, said wall being non-continuous to provide feed and discharge passages, in a horizontal plane, to and from the surface of the rotary member, adjacent its periphery, and a cleaning surface on the inner face of the arcuate wall.

6. In a machine for cleaning fruit and the like, a cleaning unit comprising: a cone-shaped rotary member and a relatively stationary arcuate wall arranged concentrically to the axis of said rotary member, to form a substantially V-shaped trough in which the fruit is movably supported and propelled in a substantially horizontal plane, said wall being non-continuous to provide feed and discharge passages, in a horizontal plane, to and from the surface of the rotary member, adjacent its periphery, and cleaning surfaces on adjacent faces of both of said members.

7. In a machine for cleaning fruit and the like, a plurality of horizontally rotating surfaces arranged peripherally adjacent each other; relatively stationary arcuate surfaces arranged substantially concentrically with the axis of each of said rotating surfaces, said stationary surfaces being disposed angularly to the rotating surfaces to provide acute substantially V-shaped troughs in which the fruit is propelled by the rotating surfaces in a substantially horizontal plane, and said stationary surfaces terminating adjacent to and overlapping the peripheries of the adjacent rotating surfaces, and cleaning means on one of each of said surfaces.

8. In a machine for cleaning fruit and the like, a plurality of horizontally rotating surfaces arranged peripherally adjacent each other; relatively stationary arcuate surfaces arranged substantially concentrically with the axis of each of said rotating surfaces, said stationary surfaces being disposed angularly to the rotating surfaces to provide substantially V-shaped troughs in which the fruit is propelled by the rotating surfaces in a substantially horizontal plane, and said stationary surfaces terminating adjacent the peripheries of the adjacent rotating surfaces; and cleaning means on one of said surfaces.

9. In a machine for cleaning fruit and the like, a plurality of horizontally rotating surfaces arranged peripherally adjacent each other; relatively stationary arcuate surfaces arranged substantially concentrically with the axis of each of said rotating surfaces, said stationary surfaces being disposed angularly to the rotating surfaces to provide acute substantially V-shaped troughs in which the fruit is propelled by the rotating surfaces in a substantially horizontal plane, and said stationary surfaces terminating adjacent the peripheries of the adjacent rotating surfaces; and cleaning means on the rotating surfaces.

10. In a machine for cleaning fruit and the like, a plurality of horizontally rotating surfaces arranged peripherally adjacent each other; relatively stationary arcuate surfaces arranged substantially concentrically with the axis of each of said rotating surfaces, said stationary surfaces being disposed angularly to the rotating surfaces to provide acute substantially V-shaped troughs in which the fruit is propelled by the rotating surfaces in a substantially horizontal plane, and said stationary surfaces terminating adjacent the peripheries of the adjacent rotating surfaces; and cleaning means on the stationary surfaces.

11. In a machine for cleaning fruit and the like, a plurality of horizontally rotating surfaces arranged peripherally adjacent each other; relatively stationary arcuate surfaces arranged substantially concentrically with the axis of each of said rotating surfaces, said stationary surfaces being disposed angularly to the rotating surfaces to provide acute substantially V-shaped troughs in which the fruit is propelled by the rotating surfaces in a substantially horizontal plane, and said stationary surfaces terminating adjacent the peripheries of the adjacent rotating surfaces; and cleaning means on said surfaces.

12. In a machine for cleaning fruit and the like, a plurality of horizontally rotating conical surfaces arranged peripherally adjacent each other; relatively stationary arcuate surfaces arranged concentrically to the axis of each of said conical surfaces, said arcuate surfaces being disposed angularly to the conical surfaces to form substantially V-shaped arcuate troughs for movably supporting the fruit for propulsion by the conical surfaces in a substantially horizontal plane, said arcuate surfaces terminating adjacent to and overlapping the peripheries of the adjacent conical surfaces, and cleaning means on one of each of said surfaces.

13. In a machine for cleaning fruit and the like, a plurality of horizontally rotating conical surfaces arranged peripherally adjacent each other; relatively stationary arcuate surfaces arranged concentrically to the axis of each of said conical surfaces, said arcuate surfaces being disposed angularly to the conical surfaces to form substantially V-shaped arcuate troughs for movably supporting the fruit for propulsion by the conical surfaces in a substantially horizontal plane, said arcuate surfaces terminating adjacent the peripheries of the adjacent conical surfaces; and cleaning means on one of each of said surfaces.

14. In a machine for cleaning fruit and the like, a plurality of horizontally rotating conical surfaces arranged peripherally adjacent each other; relatively stationary arcuate surfaces arranged concentrically to the axis of each of said conical surfaces, said arcuate surfaces being disposed angularly to the conical surfaces to form substantially V-shaped arcuate troughs for movably supporting the fruit for propulsion by the conical surfaces in a substantially horizontal plane, said arcuate surfaces terminating adjacent the peripheries of the adjacent conical surfaces; and cleaning means on the conical surfaces.

15. In a machine for cleaning fruit and the like, a plurality of horizontally rotating conical surfaces arranged peripherally adjacent each other; relatively stationary arcuate surfaces arranged concentrically to the axis of each of said conical surfaces, said arcuate surfaces being disposed angularly to the conical surfaces to form substantially V-shaped arcuate troughs for movably supporting the fruit for propulsion by the conical surfaces in a substantially horizontal plane, said arcuate surfaces terminating adjacent the peripheries of the adjacent conical surfaces; and cleaning means on the arcuate surfaces.

16. In a machine for cleaning fruit and the like, a plurality of horizontally rotating conical surfaces arranged peripherally adjacent each other; relatively stationary arcuate surfaces arranged concentrically to the axis of each of said conical surfaces, said arcuate surfaces being disposed angularly to the conical surfaces to form substantially V-shaped arcuate troughs for movably supporting the fruit for propulsion by the conical surfaces in a substantially horizontal plane, said arcuate surfaces terminating adjacent the peripheries of the adjacent conical surfaces; and cleaning means on said surfaces.

NICHOLAS J. OFSTAD.